United States Patent [19]
Wipasuramonton

[11] Patent Number: 5,540,460
[45] Date of Patent: Jul. 30, 1996

[54] AIR BAG MODULE

[75] Inventor: Pongdet P. Wipasuramonton, Rochester, Mich.

[73] Assignee: TRW Vehicle Safety Systems Inc., Lyndhurst, Ohio

[21] Appl. No.: 429,320

[22] Filed: Apr. 26, 1995

[51] Int. Cl.⁶ ................................................. B60R 21/22
[52] U.S. Cl. ..................... 280/730.1; 280/728.2
[58] Field of Search ............................ 280/730.1, 730.2, 280/728.2, 728.1, 743.1

[56] References Cited

U.S. PATENT DOCUMENTS

| | | | |
|---|---|---|---|
| 4,946,191 | 8/1990 | Putsch | 280/730.2 |
| 5,114,180 | 5/1992 | Kami et al. | 280/743.1 |
| 5,251,931 | 10/1993 | Semchena et al. | 280/730.1 |
| 5,316,336 | 5/1994 | Taguchi et al. | 280/730.2 |
| 5,439,248 | 8/1995 | Steffens et al. | 280/730.2 |

FOREIGN PATENT DOCUMENTS 0611684  2/1994  European Pat. Off. .

5-345555  12/1993  Japan .................................. 280/730.2

*Primary Examiner*—Paul N. Dickson
*Attorney, Agent, or Firm*—Tarolli, Sundheim, Covell, Tummino & Szabo

[57] ABSTRACT

A side impact air bag module (10) includes an air bag (12) having a body portion (330) which is inflatable into a position between a vehicle occupant and a side structure (54) of the vehicle (40). The air bag (12) and an inflator (14) are secured to a base plate (18) which supports the inflator and the air bag on the vehicle (40). A chute (24) is connected with the base plate (18) for storing the air bag (12) in the chute and for guiding the air bag to inflate into a position between the vehicle occupant and the vehicle side structure (54). A neck portion (300) of the air bag (12) is connected with the base plate (18) at a location outside of the chute (24). The neck portion (300) at least partially encloses the inflator (14) and directs inflation fluid into the body portion (330) to inflate the body portion. The neck portion (300) is impermeable to the inflation fluid.

16 Claims, 6 Drawing Sheets

AIR BAG MODULE

BACKGROUND OF THE INVENTION

1. Technical Field

The present invention relates to a vehicle safety apparatus and, particularly, relates to an air bag module including an inflatable vehicle occupant restraint, such as an air bag, for protecting a vehicle occupant in the event of a side impact to the vehicle.

2. Description of the Prior Art

It is known to inflate an air bag to protect a vehicle occupant in the event of a side impact to a vehicle. The air bag is stored in a deflated condition, together with an inflator, in the vehicle seat in which an occupant sits. In the event of a side impact to the vehicle, the inflator is actuated and the air bag is inflated into a position between the vehicle occupant and the adjacent side structure of the vehicle. The air bag can protect the vehicle occupant from forcefully striking or being struck by parts of the vehicle side structure such as a vehicle door. The air bag can also protect the vehicle occupant from objects which might intrude through the side structure of the vehicle during the side impact.

SUMMARY OF THE INVENTION

The present invention is an apparatus for protecting a vehicle occupant in the event of a side impact to the vehicle. The apparatus comprises an inflatable vehicle occupant restraint having a body portion which is inflatable into a position between the vehicle occupant and a side structure of the vehicle to protect the vehicle occupant, and an inflator for inflating the inflatable vehicle occupant restraint. A support member supports the inflator and the inflatable restraint on the vehicle. The inflator and the inflatable restraint are secured to the support member. A chute is connected with the support member for storing the inflatable restraint in the chute and for guiding the inflatable restraint to inflate into a position between the vehicle occupant and the vehicle side structure. The inflatable restraint has a mouth portion connected with the support member at a location outside of the chute.

The present invention is also a vehicle occupant safety apparatus for restraining a vehicle occupant in the event of a side impact to the vehicle comprising an inflatable vehicle occupant restraint and an inflation fluid source for inflating the inflatable restraint into a position to protect the vehicle occupant. The inflatable restraint has a neck portion and a body portion. The neck portion at least partially encloses the inflation fluid source. The neck portion directs inflation fluid into the body portion to inflate the body portion. The apparatus further includes a base plate for mounting the inflation fluid source and the inflatable restraint to the vehicle, and means for securing the inflation fluid source and the inflatable restraint to the base plate. The neck portion of the inflatable restraint is impermeable to the inflation fluid.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
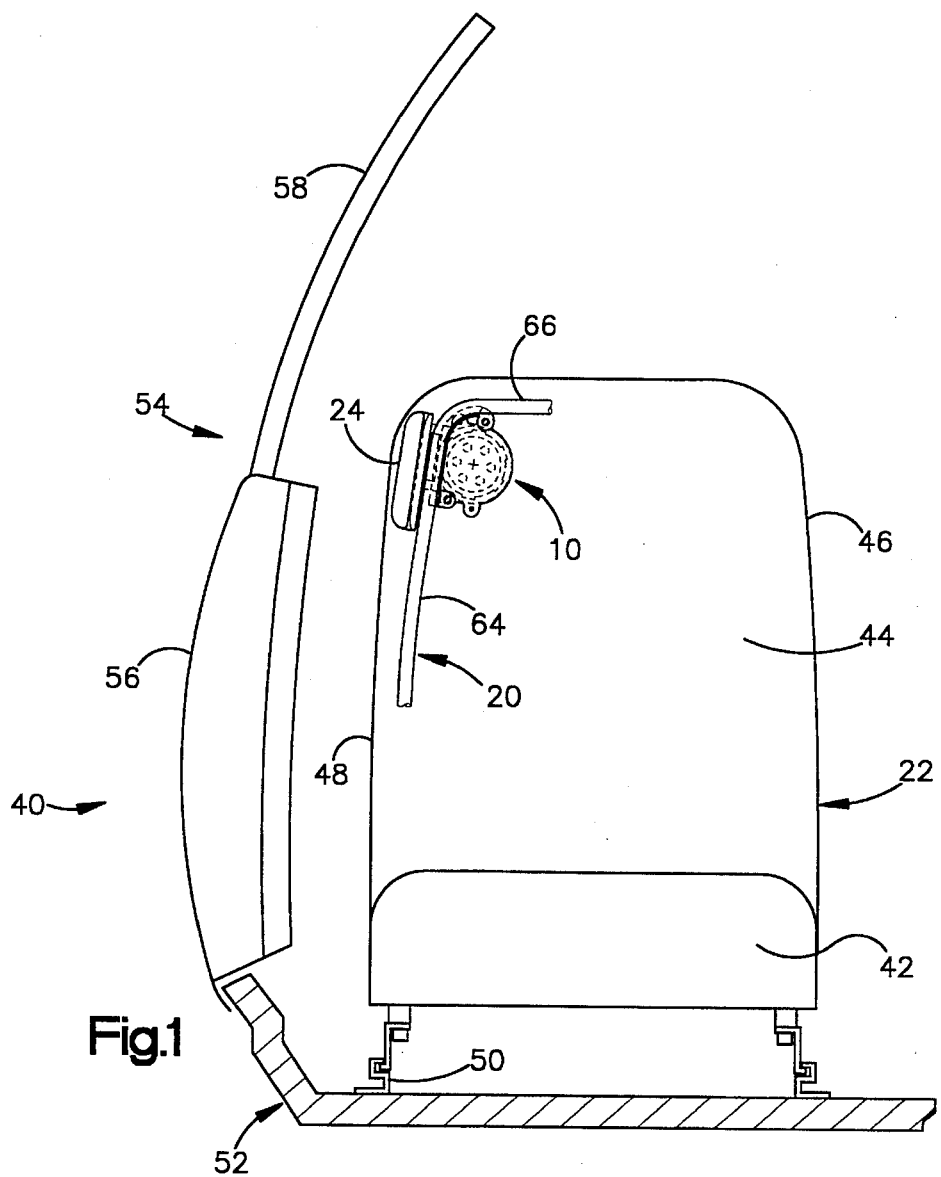
FIG. 1 is a schematic front elevational view showing a vehicle safety apparatus in accordance with the present invention mounted in a vehicle seat.

The present invention relates to a vehicle safety apparatus and, particularly, relates to an apparatus for protecting an occupant of a vehicle in the event of a side impact to the vehicle. The present invention is applicable to various vehicle safety apparatus constructions. As representative of the present invention, FIG. 1 illustrates a vehicle safety apparatus or air bag module 10.

Figure 3:
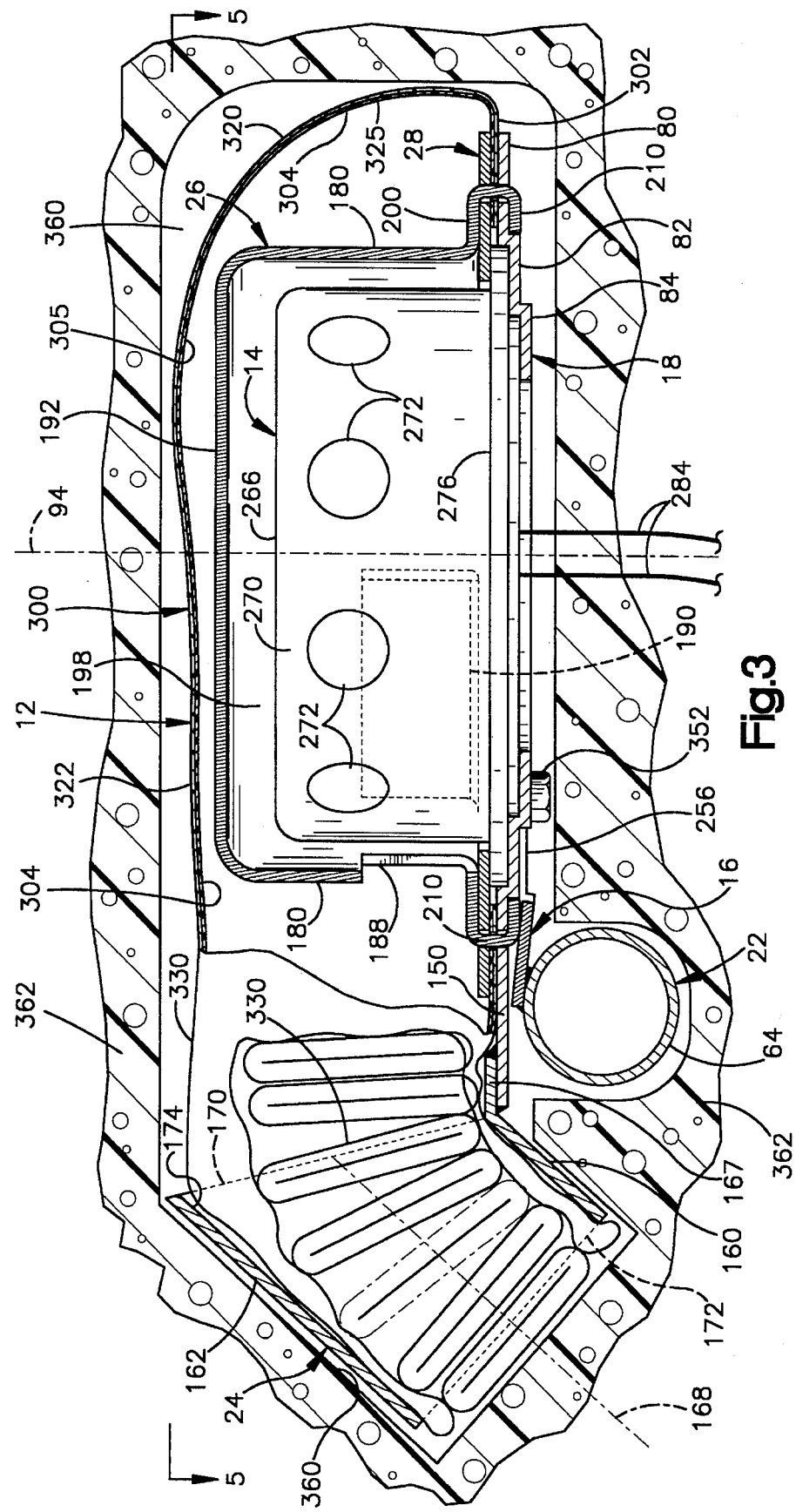
FIG. 3 is view partially in section of the vehicle safety apparatus of FIG. 1.
Figure 9:
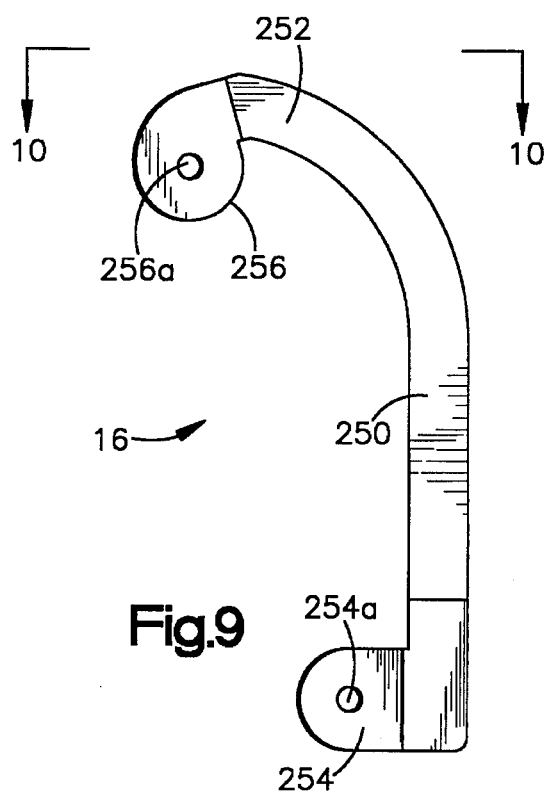
FIG. 9 is a plan view of a mounting bracket which forms a part of the vehicle safety apparatus of FIG. 1.
Figure 10:
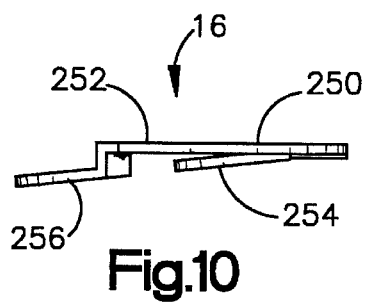
FIG. 10 is an end view of the mounting bracket taken along line 10—10 of FIG. 9.

The air bag module 10 includes an inflatable air bag 12 (FIG. 3) and an inflator 14. A mounting bracket 16 (FIGS. 9–10) and a base plate 18 (FIG. 6) secure the air bag 12 and the inflator 14 to a seat frame member 20 (FIG. 1) of a vehicle seat 22. The air bag module 10 also includes a chute 24 (FIG. 6) for guiding inflation of the air bag 12, a diffuser 26 (FIGS. 7–8), and a clamp member or washer 28 (FIG. 3).

The vehicle seat 22 (FIG. 1) is illustrated as a front passenger seat of a vehicle 40 and includes a seat bottom portion 42 and a seat back 44. The seat 22 may also include a headrest (not shown) which is supported on or formed as a portion of the vehicle seat back 44. The seat back 44 has an inboard side 46 and an outboard side 48.

The seat 22 is supported by seat tracks 50 (FIG. 1) on a body portion 52 of the vehicle 40. The vehicle body 52 also includes a side structure indicated generally at 54. In the illustrated configuration, the vehicle side structure 54 includes a door 56 and a window 58 which are disposed adjacent to the vehicle seat 22. It should be understood that the present invention is applicable to vehicles including other types of side structure, such as a van with no window or door disposed adjacent to the seat 22.

The seat frame member 20 is disposed in the seat back 44 of the vehicle seat 22. The seat frame member 20 is tubular in cross section and is generally L-shaped in configuration. The seat frame member 20 includes a first portion 64 which extends generally vertically in the seat back 44 and a second portion 66 which extends generally horizontally in the seat back 44.

The base plate 18 (FIGS. 3, 4, 6) of the air bag module 10 is stamped from sheet metal and has a generally flat configuration formed from three interconnected parallel portions. The three parallel portions of the base plate 18 are a main body portion 80, an intermediate portion 82 and a central portion 84.

The main body portion 80 (FIG. 4) of the base plate 18 has a planar configuration with parallel inner and outer side surfaces 86 and 88. The side surfaces 86 and 88 extend between an outer edge surface 90 and an inner edge surface 92 of the main body portion 80. The edge surfaces 90 and 92 extend parallel to and are concentric with an axis 94 (FIGS. 3 and 6) of the air bag module 10.

Six identical mounting slots 110 are formed in the main body portion 80 of the base plate 18. The slots 110 are equally spaced in a circular array centered on the axis 94. Each of the slots 110 is rectangular in configuration. In each slot 110, the longer sides of the slot extend perpendicular to an imaginary straight line extending between the center of the slot and the axis 94.

Figure 4:
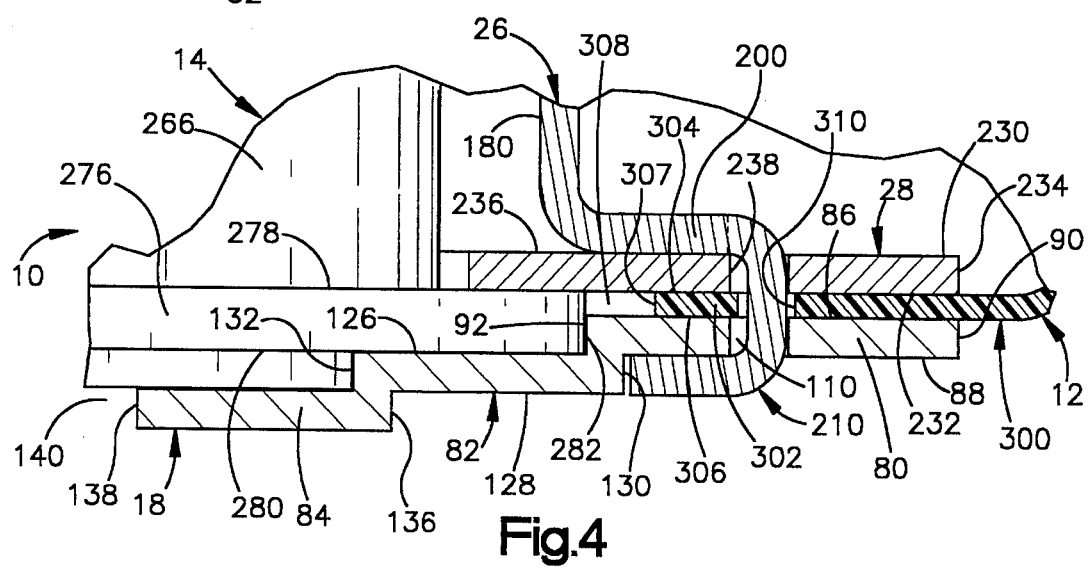
FIG. 4 is an enlarged view of a portion of FIG. 3.

The intermediate portion 82 (FIGS. 4 and 6) of the base plate 18 is formed as one piece with the main body portion 80 and is disposed radially inward of the main body portion. The intermediate portion 82 has an annular configuration and extends parallel to the main body portion 80 in a plane which is spaced apart axially from the plane of the main body portion. The intermediate portion 82 of the base plate 18 has parallel, radially extending inner and outer side surfaces 126 and 128 (FIG. 4). An outer edge surface 130 of the intermediate portion 82 is disposed adjacent to the inner edge surface 92 of the main body portion. The intermediate portion 82 of the base plate 18 also has an annular inner edge surface 132.

The central portion 84 (FIGS. 4 and 6) of the base plate 18 is formed as one piece with the intermediate portion 82 and extends radially inward from the intermediate portion. The central portion 84 has an annular configuration and extends parallel to the intermediate portion 82 in a plane which is spaced apart axially from the plane of the intermediate portion. An outer edge surface 136 of the central portion 84 is disposed adjacent to the inner edge surface 132 of the intermediate portion 82. An annular axially extending inner edge surface 138 of the central portion 84 defines a circular central opening 140 in the base plate 18. The central opening 140 is centered on the axis 94.

Figure 6:
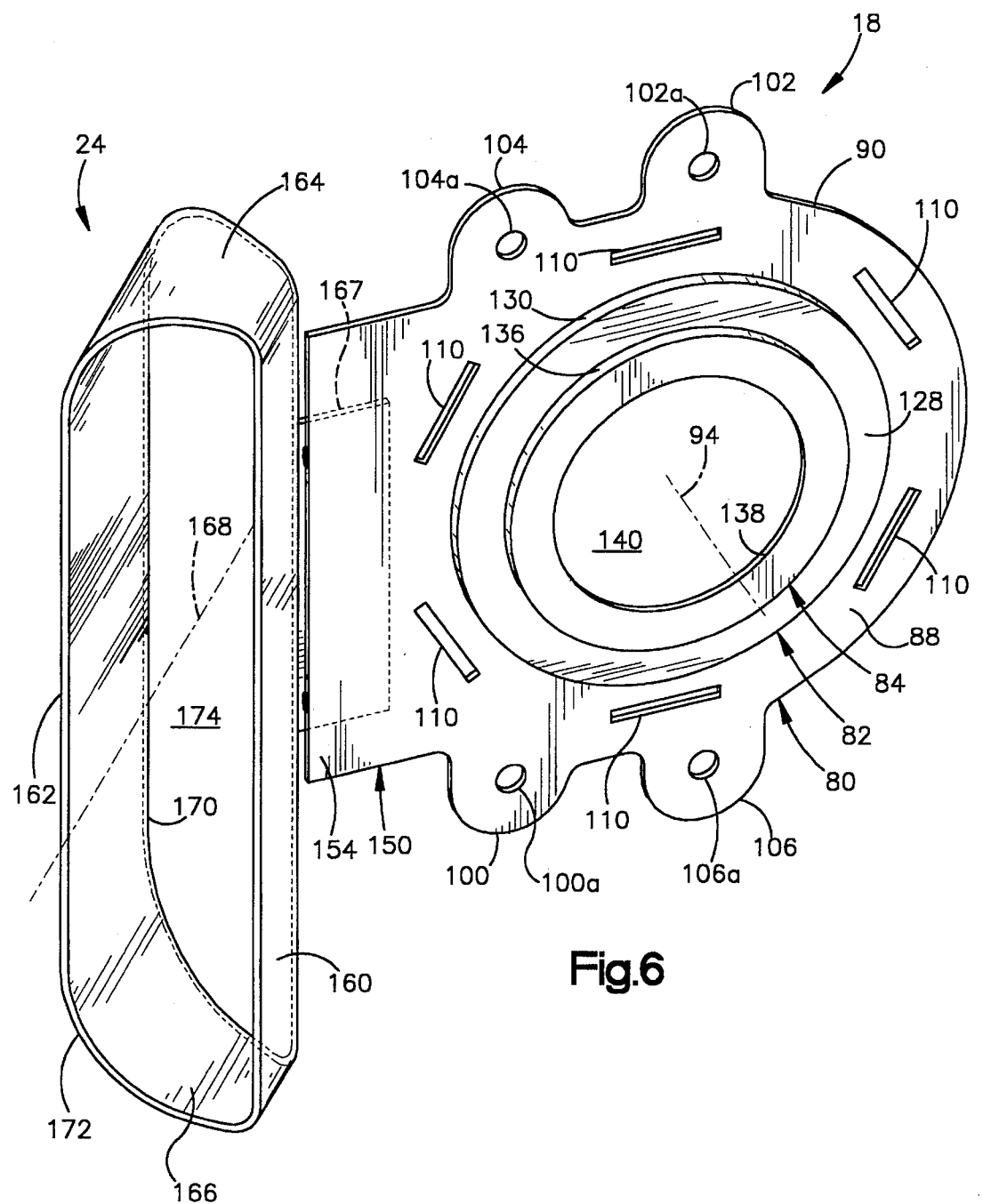
FIG. 6 is a perspective view of a base plate and chute which form a part of the vehicle safety apparatus of FIG. 1.
Figure 7:
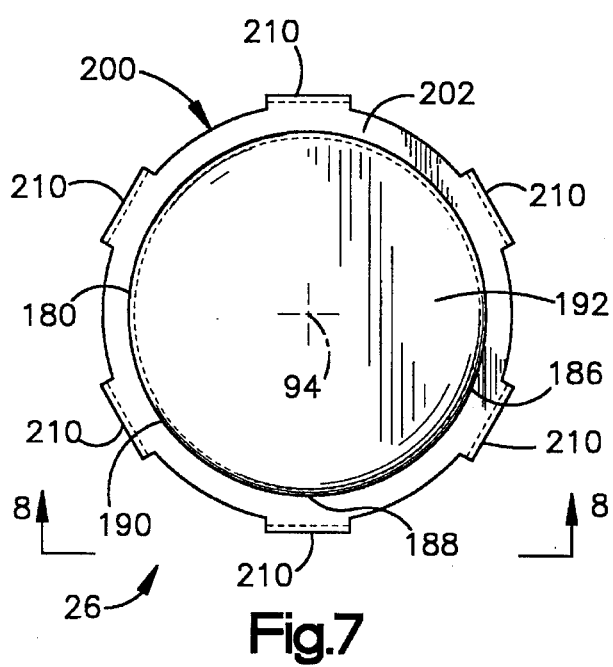
FIG. 7 is a plan view of a diffuser which forms a part of the vehicle safety apparatus of FIG. 1.

The base plate 18 includes four mounting ears 100, 102, 104 and 106 (FIG. 6). The mounting ears 100–106 are coplanar with and extend radially outward from the main body portion 80 of the base plate 18. Each one of the mounting ears 100–106 includes a respective fastener opening 100a–106a.

Figure 2:
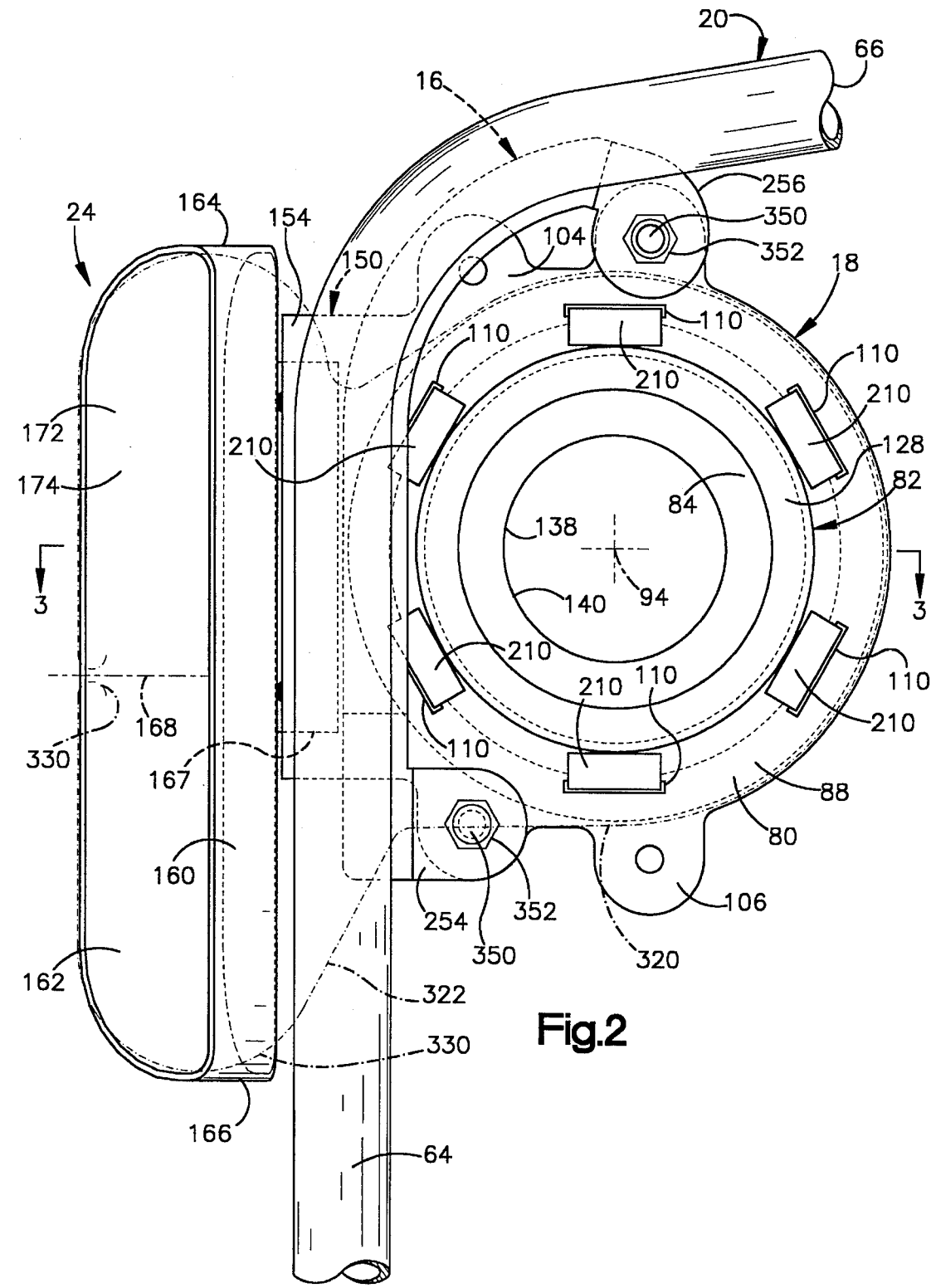
FIG. 2 is a front elevational view of the vehicle safety apparatus of FIG. 1.
Figure 5:
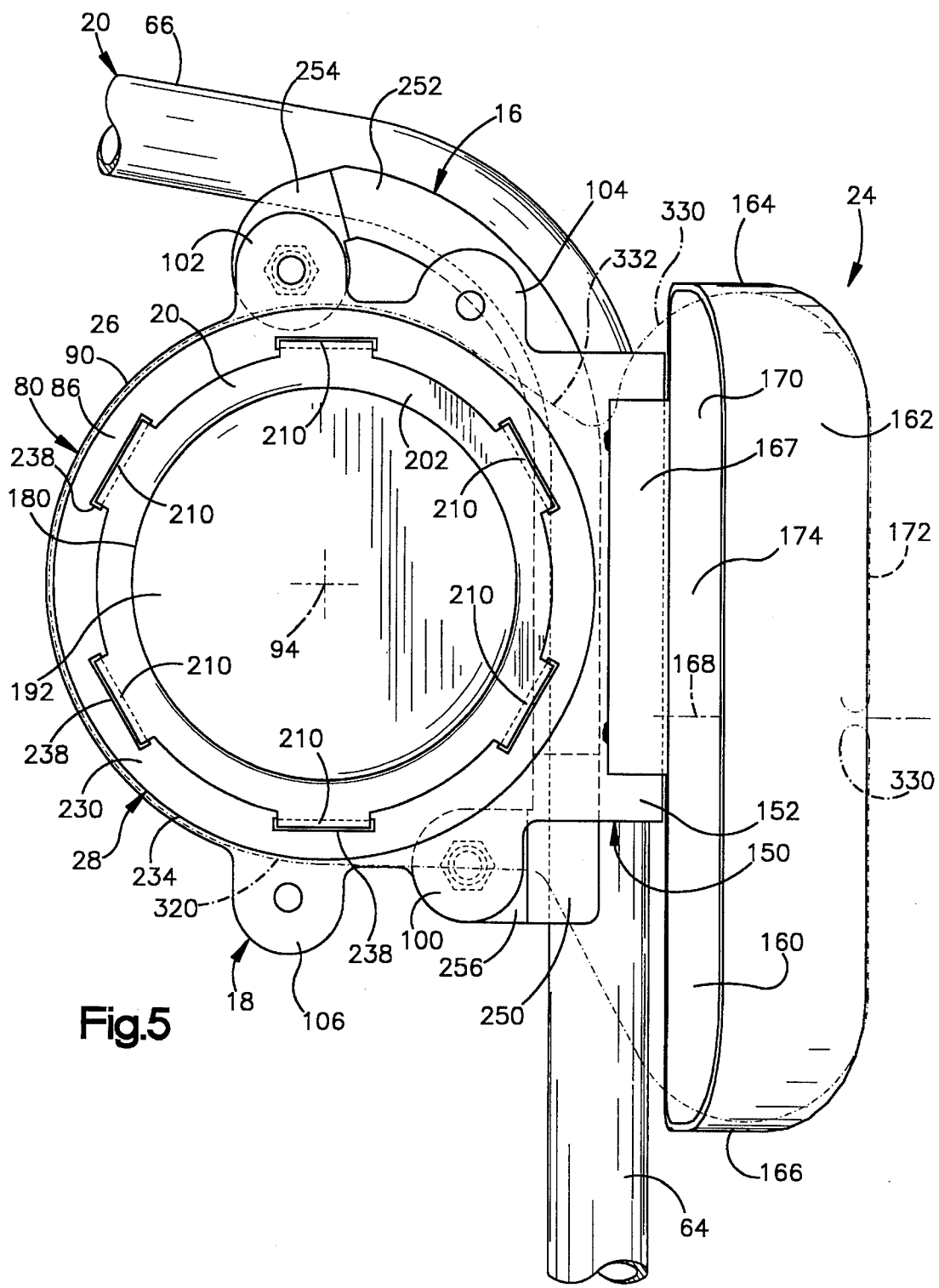
FIG. 5 is a rear elevational view of the vehicle safety apparatus of FIG. 1.

A flange portion 150 (FIG. 6) of the base plate 18 is co-planar with and formed as one piece with the main body portion 80. The flange portion 150, which has a generally rectangular configuration, extends outward from one edge of the base plate 18. The flange portion 150 has parallel radially extending inner and outer major side surfaces 152 (FIG. 5) and 154 (FIGS. 2 and 6).

The chute 24 (FIGS. 2, 5 and 6) is a metal member welded to the flange portion 150 of the base plate 18. The chute 24 could alternatively be formed as one piece with the base plate 18. Specifically, the base plate 18 is symmetrical about an imaginary line extending through the axis 94 in a direction from left to right in FIG. 5. Thus, the upper portion (as viewed in FIG. 5) of the base plate 18 is a mirror image of the lower portion (as viewed in FIG. 5) of the base plate. As a result, the base plate 18, if rotated 180° about the axis 94, can be used in an air bag module which is similar to the air bag module 10 and which is mounted on a front driver seat of the vehicle 40 rather than on the front passenger seat 22. A chute which is a mirror image of the chute 24 would in that case be welded in the flange 150 of the base plate 18. It should be understood that the chute 24 could alternatively be formed as one piece with the base plate 18.

The chute 24 has an oblong tubular configuration and includes an inner side wall 160 which extends at an angle to the flange portion 150 of the base plate 18. An outer side wall 162 of the chute 24 extends generally parallel to the inner side wall 160. Two curved end walls 164 and 166 of the chute 24 extend between and interconnect the inner and side walls 160 and 162. A planar mounting flange portion 167 of the chute 24 is welded to the flange portion 150 of the base plate 18.

The walls 160–166 of the chute 24 define an inlet opening 170 and an outlet opening 172 of the chute. A chamber or passage 174, enclosed within and defined by the walls 160–166, extends between the inlet opening 170 and the outlet opening 172 of the chute 24.

The chute 24 has a central axis 168 which extends parallel to the chute walls 160–166. The chute axis 168 extends between the inlet opening 170 and the outlet opening 172 at an angle to the plane of the main body portion 80 of the base plate 18. The chute axis 168 does not extend through the inflator 14. In the illustrated embodiment, the chute axis 168 extends at an angle of about 48° to the plane of the main body portion 80 of the base plate 18. It should be understood that the chute axis 168, and the walls 160–166 of the chute 24, could extend at an angle other than 48° to the plane of the main body portion 80 of the base plate 18, in order to guide the air bag 12 to inflate in a different direction.

The diffuser 26 (FIGS. 3–4 and 7–8) is a one-piece generally cup-shaped metal member and includes a cylindrical axially extending side wall 180 which is centered on the axis 94. Three spaced apart fluid flow openings 186, 188, and 190 (FIG. 8) are formed in the side wall of the diffuser 26. Each fluid flow opening 186–190 has an angular extent of approximately 50°. The fluid flow openings 186–190 are disposed between the inflator 14 and the chute 24 on an approximately 180° sector of the side wall 180 of the diffuser 26.

Figure 8:
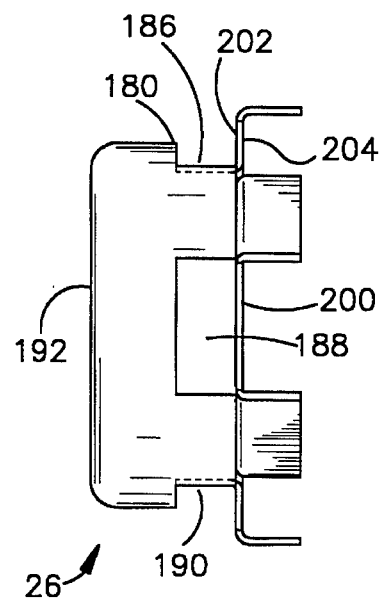
FIG. 8 is an elevational view of the diffuser taken along line 8—8 of FIG. 7.

The diffuser side wall 180 is formed as one piece with a radially extending end wall 192 (FIG. 3). The side wall 180 and the end wall 192 of the diffuser 26 define a diffuser chamber 198 in the diffuser. An annular mounting portion or mounting flange 200 of the diffuser 26 extends radially outward from the diffuser side wall 180 in a direction parallel to the end wall 192. The mounting flange 200 has parallel radially extending inner and outer side surfaces 202 and 204 (FIG. 8).

The diffuser 26 includes six identical mounting tabs 210 which project axially from the outer periphery of the mounting flange 200 of the diffuser. The mounting tabs 210 are equally spaced in a circular array centered on the axis 94. Each mounting tab 210 is generally planar and has a rectangular configuration sized to fit through the mounting slots 110 in the base plate 18.

The washer 28 (FIGS. 3–5) is a flat, annular piece of metal having parallel radially extending inner and outer side surfaces 230 and 232 (FIG. 4). An annular outer peripheral edge surface 234 of the washer 28 extends axially between the inner and outer side surfaces 230 and 232. A radially inner portion 236 of the washer 28 defines a circular central opening in the washer.

Six identical mounting slots 238 are formed in the washer 28. The mounting slots 238 extend axially through the washer 28 between the inner and outer side surfaces 230 and 232. Each mounting slot 238 has a rectangular configuration similar to the configuration of the slots 110 in the base plate 18. The mounting slots 238 in the washer 28 are equally spaced in a circular array centered on the axis 94 for receiving the mounting tabs 210 on the diffuser 26.

The mounting bracket 16 (FIGS. 9 and 10) is a single piece of sheet metal stamped and formed to a generally J-shaped configuration. The mounting bracket 16 is generally planar and includes a main leg 250 and a secondary leg 252. A first end portion 254 projects out of the plane of the main leg 250 of the mounting bracket 16 at the outer end of the main leg. A fastener opening 254a is formed in the first end portion 254 of the mounting bracket 16. A second end portion 256 of the mounting bracket 16 is disposed at the outer end of the secondary leg 252 and projects out of the plane of the secondary leg. A fastener opening 256a is formed in the second end portion 256 of the mounting bracket 16.

The inflator 14 (FIGS. 3 and 4) is a known pyrotechnic air bag inflator having a cylindrical main body portion 266. The main body portion 266 of the inflator 14 has a cylindrical, axially extending side wall 270 which is centered on the axis 94. A plurality of gas outlet openings 272 (FIG. 3) are equally spaced in a circular array along the side wall 270 of the inflator 14. A radially extending mounting flange 276 of the inflator 14 has parallel inner and outer side surfaces 278 and 280 (FIG. 4). An annular outer edge surface 282 of the mounting flange 276 extends axially between the inner and outer side surfaces 278 and 280.

Lead wires 284 (FIG. 3) extend from the main body portion 266 of the inflator 14. The lead wires 284 are connected to electric circuitry (not shown) of the vehicle 40 including a collision sensor and a power source such as the vehicle battery.

The air bag 12 (FIG. 3) is made from a fabric material such as woven nylon. The air bag 12 has a tubular neck portion 300. The neck portion 300 includes an annular mouth portion 302 which has parallel radially extending inner and outer side surfaces 304 and 306. The inner side surface 304 (FIG. 3) of the entire neck portion 300 of the air bag 12 is coated with a layer 305 of neoprene to make the mouth portion of the air bag impermeable to inflation fluid from the inflator 14. An inner edge surface 307 (FIG. 4) of the mouth portion 302 defines a circular inflator opening 308 in the neck portion 300 of the air bag 12.

Six mounting slots 310 (FIG. 4) are formed in the mouth portion 302 of the air bag 12. The mounting slots 310 are equally spaced in a circular array around the opening 308 for receiving the mounting tabs 210 on the diffuser 26. The air bag 12 also includes a body portion 330 which is connected in fluid communication with the neck portion 300. The body portion 300 is configured so that, when inflated, it can protect an occupant of the vehicle seat 12 in the event of a side impact to the vehicle 40.

The air bag module 10 is assembled by first moving the diffuser 26 and the washer 28 through the inflator opening in the neck portion 300 of the air bag 12 to a position inside the air bag. The diffuser 26 is engaged with the washer 28 so that the mounting tabs 210 on the diffuser extend through the mounting slots 238 in the washer. The diffuser 26 and the washer 28 are positioned within the air bag 12 so that the mounting tabs 210 on the diffuser also extend through the mounting slots 310 in the mouth portion 302 of the air bag. The washer 28 is disposed between the mounting flange 200 of the diffuser 12 and the mouth portion 302 of the air bag 12. The inner edge portion 236 of the washer 28 is spaced radially inward from the inner edge surface 307 of the air bag 12. The mounting tabs 210 on the diffuser 26 are straight as shown in FIG. 8 and are not yet bent as shown in FIGS. 2–5.

The main body portion 266 of the inflator 14 is thereafter inserted into the air bag 12 through the inflator opening to a position within the side wall 180 of the diffuser 26. The movement of the inflator 14 stops when the mounting flange 276 (FIG. 4) on the inflator 14 engages the washer 28. Specifically, the inner side surface 278 of the mounting flange 276 of the inflator 14 engages the outer side surface 232 of the inner edge portion 236 of the washer 28. The outer edge 282 of the mounting flange 276 of the inflator 14 is spaced radially inward from the mounting slots 238 in the washer 28 and is also spaced radially inward from the inner edge 307 of the air bag 12.

The base plate 18 is next positioned against the air bag 12 and the inflator 14 as seen in FIGS. 3 and 4, so that the mounting tabs 210 on the diffuser 26 extend through the mounting slots 110 in the base plate. The outer side surface 306 of the neck portion 300 of the air bag 12 overlies the main body portion 80 of the base plate 18. The outer side surface 280 of the mounting flange 276 of the inflator 14 overlies the intermediate portion 82 of the base plate 18. The central portion 84 of the base plate 18 is spaced apart axially from the inflator 14.

When the parts of the air bag module 10 are at this stage of assembly, end portions of the mounting tabs 210 on the diffuser 26 project axially from the base plate 18. The projecting end portions of the mounting tabs 210 on the diffuser 26 are thereafter bent radially inward so as to overlie the outer side surface 88 of the main body portion 80 of the base plate, as seen in FIGS. 3 and 4. When the mounting tabs 210 are bent radially inward in this manner, the end portions of the mounting tabs are co-planar with the intermediate portion 82 of the base plate 18.

The mounting tabs 210 on the diffuser 26 clamp together the base plate 18, the air bag 12, the washer 28, the inflator 14 and the diffuser 26. The radially inner portion 236 of the washer 28 clamps the inflator 14 against the base plate 18. The radially outer portion of the washer 28 clamps the neck portion 300 of the air bag 12 against the base plate 18 at a location spaced from and outside of the chute 24.

The neck portion 300 of the air bag 12 extends around and wraps around the inflator 14 and the diffuser 26 as best seen in FIG. 3. A first section 320 of the neck portion 300 of the air bag 12 curves around the side wall 180 of the diffuser 26. The first section 320 merges with a second section 322 which extends parallel to and outside of the end wall 192 of the diffuser 26.

The body portion 330 of the air bag 12 extends outward from the neck portion 300 in a direction away from the inflator 14. The body portion 330 of the air bag 12 is preferably uncoated woven nylon. The body portion 330 of the air bag 12 is folded and stored in the air bag module 10 prior to actuation of the inflator 14. At least a portion, and preferably substantially all, of the body portion 330 of the air bag 12 is folded and stored in the chute 24 as best seen in FIG. 3. Some of the body portion 330 may be folded and stored between the chute 24 and the diffuser 26. Preferably only a minimal amount, or even none, of the folded body portion 330 of the air bag 12 projects beyond the outlet opening 172 of the chute 24.

To secure the assembled air bag module 10 in the vehicle seat back 44, the mounting bracket 16 is first welded to the seat frame member 20. The main leg 250 of the mounting bracket 16 is welded to the vertically extending portion 64 of the seat frame member 20. The secondary leg 252 of the mounting bracket 16 is welded to the horizontally extending portion 66 of the seat frame member 20.

The base plate 18 of the assembled air bag module 10 is then secured to the mounting bracket 16 with a pair of bolts 350 and nuts 352 (FIG. 2). One of the bolts 350 extends through the fastener opening 254a in the first end portion 254 of the mounting bracket 16 and through the fastener opening 102a in the mounting ear 102 on the base plate 18. The other bolt 350 extends through the fastener opening 256a in the second end portion 256 of the mounting bracket 16 and through the fastener opening 100a in the mounting ear 100 on the base plate 18. The nuts 352 are screwed on the bolts 350 to secure the mounting bracket 16 to the base plate 18. As a result, the base plate 18, the inflator 14, the air bag 12, the chute 24, the diffuser 26, and the washer 28 are securely fastened to the seat frame member 20.

The air bag module 10, when mounted to the seat frame member 20, is disposed within a cavity 360 (FIG. 3) in the foam material 362 of the vehicle seat back 44. The cavity 360 is large enough so as not to inhibit the flow of inflation fluid from the inflator 14 through the neck portion 300 of the air bag 12 into the body portion 330 of the air bag. The chute 24, along with the body portion 330 of the air bag 12, is covered from the outside of the seat back 44 by the foam material 362 and a fabric material covering (not shown). The foam material 362 and the fabric material covering are selected and installed so as not to prevent inflation of the air bag 12 into the space between the vehicle seat 22 and the vehicle side structure 54. If desired, the air bag module 10 can be enclosed in a plastic wrapping material (not shown) within the cavity 360.

In the event of a side impact to the vehicle 40 of a magnitude requiring inflation of the air bag 12, the vehicle electric circuitry including the collision sensor sends an electric current over the lead wires 284 of the inflator 14. The inflator 14 is actuated in a known manner and directs inflation fluid under pressure into the chamber 198 (FIG. 3) in the diffuser 26. The walls 180 and 192 of the diffuser 26 direct the inflation fluid through the fluid flow openings 186, 188, and 190 in the diffuser and into the neck portion 300 of the air bag 12. The inflator 14, because it is a pyrotechnic inflator, generates heat when actuated. The diffuser 26 acts as a heat shield and prevents the neck portion 300 of the air bag 12 from contacting the inflator 14 during and after inflation of the air bag.

The neck portion 300 of the air bag 12 acts as a flexible duct to direct the inflation fluid from the diffuser 26 into the body portion 330 of the air bag. As the inflation fluid from the inflator 14 flows into and through the neck portion 300 of the air bag 12, the neoprene coating 305 on the inner side surface 304 of the mouth portion of the air bag prevents leakage of inflation fluid from the inside of the air bag to the outside. If the neck portion 300 of the air bag 12 were permeable, then there would likely be some leakage of inflation fluid through the neck portion of the air bag, and higher fluid pressures would be needed to compensate for the leakage. Because the neck portion 300 of the air bag 12 is coated and impermeable, a metal housing of the type commonly used in passenger side air bag modules is not needed to perform this function.

The inflation fluid flows from the neck portion 300 of the air bag 12 into the body portion 330 of the air bag. The body portion 330 of the air bag 12 inflates from the folded, stored condition shown in the drawings to an inflated condition (not shown), adjacent to the vehicle side structure 54, to protect the vehicle occupant.

The chute 24 guides inflation of the air bag 12 in addition to storing the folded air bag. As the air bag 12 unfolds and inflates, the chute 24 directs the material of the inflating air bag to move in the direction of the chute axis 168. Also, the walls 160–166 of the chute 24 cause the inflation fluid flowing through the chute to exit the passage 174 in the chute in a direction parallel to the chute axis 168. This directional control of the inflation fluid further directs the body portion 330 of the air bag 12 to inflate in the direction of the chute axis 168. This direction of fluid flow is selected so that the body portion 330 of the air bag 12 inflates forward and outward relative to the vehicle seat back 44 between the head of an occupant of the vehicle seat 22 and the side structure 54 of the vehicle 52.

In the illustrated embodiment, the chute axis 168 and the walls 160–166 of the chute 24 extend at an angle of about 48° to the plane of the main body portion of the base plate 18. By positioning the chute 24 at a different angle relative to the base plate 18, the direction of inflation of the body portion 330 of the air bag 12 can be changed. The preferred angle between a front-to-back axis of the vehicle 40 and the chute axis 168 will typically be between about 15° and about 35°. The preferred angle is a function of (a) the angle of mounting of the chute 24 on the base plate 18 and (b) the angle of mounting of the base plate relative to the front-to-back axis of the vehicle. The preferred angle depends on the size of the vehicle, the shape of the vehicle seat, and the distance between the vehicle seat and the vehicle side structure. For example, in a relatively large vehicle, the seat frame of the vehicle seat is typically relatively far from the vehicle door, and so the angle between a front-to-back axis of the vehicle and the chute axis may need to be relatively large. Conversely, in a relatively small vehicle, the seat frame of the vehicle seat is typically relatively close to the vehicle door, and so the angle between a front-to-back axis of the vehicle and the chute axis could be relatively smaller.

From the above description of the invention, those skilled in the art will perceive improvements, changes, and modifications in the invention. Such improvements, changes, and modifications within the skill of the art are intended to be covered by the appended claims.

Having described the invention, I claim:

1. An apparatus for protecting a vehicle occupant in the event of a side impact to the vehicle, comprising:

a seat for an occupant of the vehicle, said seat including a seat frame member; and an occupant protection module comprising an inflatable vehicle occupant restraint having a body portion which is inflatable into a position between the vehicle occupant and a side structure of the vehicle to help protect the occupant of the vehicle seat;

said module comprising an inflator for inflating said inflatable vehicle occupant restraint;

said module comprising a support member supporting said inflator and said inflatable restraint on said seat frame member of said vehicle seat;

said module comprising means for securing said inflator and said inflatable restraint to said support member; and said module comprising a chute fixed to said support member for storing said inflatable restraint in said chute and for guiding said inflatable restraint to inflate into a position between the vehicle occupant and the vehicle side structure;

said inflatable restraint having a mouth portion connected with said support member at a location outside of said chute.

2. An apparatus as set forth in claim 1 wherein said chute has a tubular configuration including interconnected side walls which define an inlet opening in said chute through which the inflatable restraint extends and for receiving inflation fluid from said inflator, said side walls defining an outlet opening in said chute opposite from said inlet opening through which said body portion of said inflatable restraint extends when said inflatable restraint is in an inflated condition.

3. An apparatus as set forth in claim 1 wherein said inflator has a generally cylindrical main body portion which extends around a central axis of said inflator, said chute being spaced apart radially from said inflator.

4. An apparatus as set forth in claim 1 wherein said chute has a chute axis which extends at an acute angle relative to a front-to-back axis of the vehicle, said inflatable restraint having a neck portion comprising a flexible duct for directing inflation fluid from said inflator into said body portion of said inflatable restraint.

5. An apparatus as set forth in claim 1 wherein said chute comprises wall means for directing inflation fluid to flow in a predetermined direction through said chute into said body portion of said inflatable restraint to cause said body portion of said inflatable restraint to inflate in said predetermined direction.

6. An apparatus for protecting a vehicle occupant in the event of a side impact to the vehicle, comprising:

an inflatable vehicle occupant restraint having a body portion which is inflatable into a position between the vehicle occupant and a side structure of the vehicle to protect the vehicle occupant;

an inflator for inflating said inflatable vehicle occupant restraint;

a support member for supporting said inflator and said inflatable restraint on the vehicle;

means for securing said inflator and said inflatable restraint to said support member; and a chute connected with said support member for storing said inflatable restraint in said chute and for guiding said inflatable restraint to inflate into a position between the vehicle occupant and the vehicle side structure;

said inflatable restraint having a mouth portion connected with said support member at a location outside of said chute;

said chute having a tubular configuration including interconnected side walls which define an inlet opening in said chute for receiving inflation fluid from said inflator and which define an outlet opening in said chute opposite from said inlet opening through which said body portion of said inflatable restraint extends when said inflatable restraint is in an inflated condition;

said chute walls defining a chute axis which extends at an angle of from about 15° to about 35° relative to a front-to-back axis of the vehicle, said chute guiding said inflatable restraint to inflate in a forward direction in the vehicle and at an angle toward the side structure of the vehicle.

7. An apparatus for protecting a vehicle occupant in the event of a side impact to the vehicle, comprising:

an inflatable vehicle occupant restraint having a body portion which is inflatable into a position between the vehicle occupant and a side structure of the vehicle to protect the vehicle occupant;

an inflator for inflating said inflatable vehicle occupant restraint;

a support member for supporting said inflator and said inflatable restraint on the vehicle;

means for securing said inflator and said inflatable restraint to said support member; and a chute connected with said support member for storing said inflatable restraint in said chute and for guiding said inflatable restraint to inflate into a position between the vehicle occupant and the vehicle side structure;

said inflatable restraint having a mouth portion connected with said support member at a location outside of said chute;

said chute having a tubular configuration including interconnected side walls which define an inlet opening in said chute for receiving inflation fluid from said inflator and which define an outlet opening in said chute opposite from said inlet opening through which said body portion of said inflatable restraint extends when said inflatable restraint is in an inflated condition;

said side walls of said chute defining a chute axis extending from said outlet opening generally in the direction of inflation of said body portion of said inflatable restraint.

8. An apparatus as set forth in claim 7 wherein said support member has a generally planar main body portion to which said inflator and said inflatable restraint are secured, a first one of said side walls of said chute being connected with said main body portion of said support member, said chute axis extending at an angle to the plane of said main body portion of said support member.

9. An apparatus for protecting a vehicle occupant in the event of a side impact to the vehicle, comprising:

an inflatable vehicle occupant restraint having a body portion which is inflatable into a position between the vehicle occupant and a side structure of the vehicle to protect the vehicle occupant;

an inflator for inflating said inflatable vehicle occupant restraint;

a support member for supporting said inflator and said inflatable restraint on the vehicle;

means for securing said inflator and said inflatable restraint to said support member; and a chute connected with said support member for storing said inflatable restraint in said chute and for guiding said inflatable restraint to inflate into a position between the vehicle occupant and the vehicle side structure;

said inflatable restraint having a mouth portion connected with said support member at a location outside of said chute;

said inflator having a generally cylindrical main body portion and a radially extending mounting flange;

said inflatable restraint including a mouth portion defining a circular inflator opening in said inflatable restraint;

said support member having an annular body portion and a generally planar flange portion extending radially from one side of said body portion;

said means for securing said inflator and said inflatable restraint to said support member comprising means for clamping said mouth portion of said inflatable restraint and said mounting flange of said inflator to said body portion of said support member;

said chute having an open-ended tubular configuration including a plurality of interconnected side walls, said side walls defining in said chute an inlet opening and an opposite outlet opening, at least one of said side walls being connected with said flange portion of said support member to secure said chute to said support member.

10. An apparatus for protecting a vehicle occupant in the event of a side impact to the vehicle, comprising:

an inflatable vehicle occupant restraint having a body portion which is inflatable into a position between the vehicle occupant and a side structure of the vehicle to protect the vehicle occupant;

an inflator for inflating said inflatable vehicle occupant restraint;

a support member for supporting said inflator and said inflatable restraint on the vehicle;

means for securing said inflator and said inflatable restraint to said support member; and a chute connected with said support member for storing said inflatable restraint in said chute and for guiding said inflatable restraint to inflate into a position between the vehicle occupant and the vehicle side structure;

said inflatable restraint having a mouth portion connected with said support member at a location outside of said chute;

said chute having a chute axis which extends at an acute angle relative to a front-to-back axis of the vehicle, said inflatable restraint having a neck portion comprising a flexible duct for directing inflation fluid from said inflator into said body portion of said inflatable restraint; and wherein said chute axis does not extend through said inflator.

11. A vehicle occupant safety apparatus for protecting a vehicle occupant in the event of a side impact to the vehicle, comprising:

an inflatable vehicle occupant restraint;

an inflation fluid source for inflating said inflatable restraint into a position to protect the vehicle occupant;

said inflatable restraint having a neck portion and a body portion, said neck portion at least partially enclosing said inflation fluid source, said neck portion directing inflation fluid into said body portion to inflate said body portion;

a base plate for mounting said inflation fluid source and said inflatable restraint to the vehicle; and means for securing said inflation fluid source and said inflatable restraint to said base plate;

said neck portion of said inflatable restraint being impermeable to said inflation fluid; and said apparatus further comprising a body of seat cushion material surrounding said inflatable restraint when said inflatable restraint is in an uninflated condition, said neck portion of said inflatable restraint being disposed adjacent to said body of seat cushion material, said impermeable neck portion of said inflatable restraint blocking flow of inflation fluid from said inflation fluid source to said body of seat cushion material.

12. An apparatus as set forth in claim 11 wherein said base plate includes a frame mounting portion for mounting said base plate to a seat frame member of a seat of the vehicle, said apparatus further comprising means connected with said frame mounting portion of said base plate for securing said base plate to the seat frame member.

13. An apparatus as set forth in claim 11 wherein said base plate has a generally planar configuration, said inflation fluid source having a main body portion disposed on a first side of said base plate, said neck portion of said inflatable restraint having a tubular configuration and extending from said first side of said base plate and around said main body portion of said inflation fluid source, said neck portion of said inflatable restraint extending in a first direction away from said inflation fluid source toward said body portion of said inflatable restraint.

14. An apparatus as set forth in claim 11 wherein said neck portion of said inflatable restraint comprises at least one panel of permeable fabric material having first and second opposite major side surfaces, said neck portion of said inflatable restraint comprising a coating of impermeable material on one of said first and second opposite major side surfaces of said panel.

15. An apparatus as set forth in claim 11 wherein said base plate has a generally planar mounting portion, said inflation fluid source having a mounting flange overlying a first portion of said mounting portion of said base plate, said neck portion of said inflatable restraint having a tubular configuration and having an end portion which is co-planar with said inflator flange and which overlies a second portion of said mounting portion of said base plate.

16. An apparatus as set forth in claim 11 wherein said neck portion of said inflatable restraint forms a flexible duct for directing said inflation fluid from said inflation fluid source into said body portion of said inflatable restraint.

* * * * *